Sept. 6, 1966
D. LUSK
3,270,910
JOINT STRUCTURE
Filed June 28, 1963
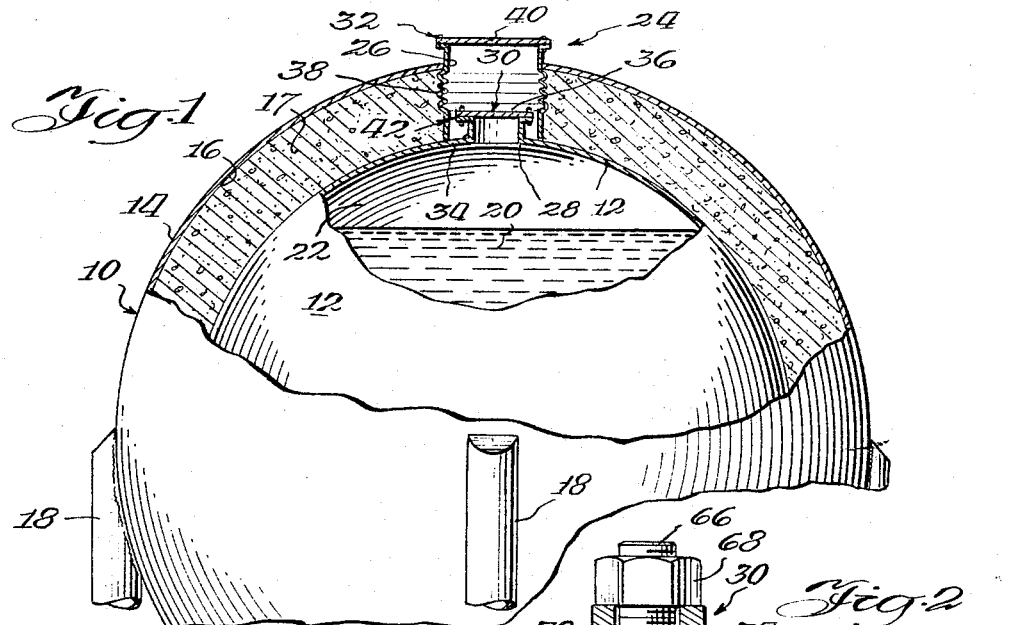
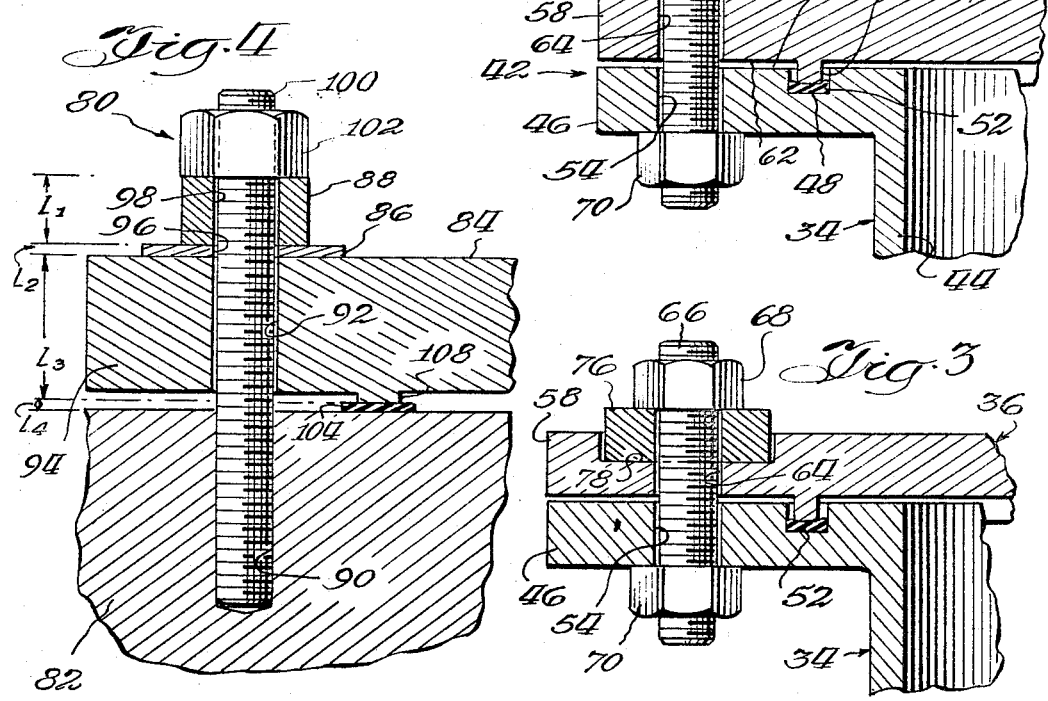
INVENTOR.
Dudley Lusk
BY
Merriam, Smith & Marshall
Attorneys United States Patent Office 3,270,910
Patented Sept. 6, 1966

3,270,910
JOINT STRUCTURE
Dudley Lusk, Westmont, Ill., assignor to Chicago Bridge
& Iron Company, a corporation of Illinois
Filed June 28, 1963, Ser. No. 291,454
4 Claims. (Cl. 220—55)

This invention relates to a joint structure and method of providing a sealed joint, for applications involving substantial temperature changes, and especially, for cryogenic applications.

In recent years, there has been a marked expansion in the use of cryogenic liquefied gases in metallurgical and chemical industries and in the missile program. Cryogenic liquefied gases such as argon, ethylene, hydrogen, methane, nitrogen, and oxygen are being used in ever increasing quantities. The storage, transportation, and use of the cryogens poses numerous peculiar problems. Thus, for example, the liquefied normally gaseous cryogens are stored in spherical and cylindrical vessels ranging from laboratory size vessels to commercial vessels eighty feet in diameter, at extremely low temperatures near their boiling points at storage pressures from atmospheric to 5500 p.s.i. pressure. Double wall vessels are employed to maintain the storage temperatures, the vessels having concentric inner and outer walls separated by an insulation space. The storage temperatures are also maintained by partial evaporation of the liquid and venting of the resulting vapor.

Properly designed fittings are vital in the construction of safe and economical cryogenic vessels. Connecting piping, vents, valves, gauges, etc., must be given the same care in selection of materials, fabrication and installation as is given to the vessel proper. The construction materials for the fittings must be compatible with the cryogens, suitable for the service temperatures, and durable under the extremes of operating temperatures and pressures.

A particular problem is the prevention of leakage of product at the fittings employed in cryogenic applications. It is difficult to prevent leakage at joints while constructing the joints and associated fittings of materials having the necessary compatibility, strength, ductility and other properties. As an example, it is difficult to retain the seating of gaskets in cryogenic flanges and the like where the flanges, gaskets, and bolts or other fastening means are made of dissimilar materials with different coefficients of thermal expansion under given temperature change conditions. During cooling to cryogenic temperatures and at cool-down, the resulting different degrees of contraction cause the gaskets to lose their seating force. Even when all materials of construction are the same, the cooling will cause some portions of the joint to cool at faster rates than others due to poor heat flow between the materials, producing "temperature lags" in some portions relative to others. The resulting differences in contraction will cause a loss in seating force. Alternatively, the differences in contraction may impose excessive stresses on component parts of the joints.

The present invention provides a joint structure having component parts subject to different degrees or percentages of thermal expansion under given temperature change conditions, which structure is compensated for differential changes in dimension caused by such conditions. The invention finds valuable application in forming joints with fittings mounted on cryogenic vessels, and also in forming other joints subjected to extremes of temperature. A very simple, economical, safe and reliable joint structure is provided which insures that when the joint is placed in service, a tight joint will be maintained. The invention further embodies an improved method of providing a sealed joint at a cryogenic temperature.

These and other objects, advantages and functions of the invention will be apparent on reference to the specification and to the attached drawings illustrating preferred embodiments of the invention, wherein like parts are identified by like reference symbols in each of the views, and wherein:

FIGURE 1 is an elevational view with parts broken away and in section, of a cryogenic vessel provided with a joint structure according to the invention;

FIG. 2 is an enlarged fragmentary sectional view of the joint structure;

FIG. 3 is a similar view of a modified form of the joint structure illustrated in FIG. 2; and FIG. 4 is a similar view of another embodiment of the joint structure.

In a preferred form of the invention, a joint structure is provided which includes a joint element for joining one member to another, fastening means subject to a different coefficient or percentage of expansion from the joint element under given temperature change conditions, and a compensating element subject to a further different coefficient of expansion under such conditions, the compensating element being dimensioned to achieve a predetermined relationship by thermally induced changes in dimensions from those at ambient temperature to those at a service temperature of the fastening means and the parts fastened together thereby. The dimension of the compensating element can be picked to approximately equalize the normally thermally induced changes in dimensions under such conditions, or it can be selected with a dimension to increase or decrease stress on the fastening means by thermal change.

Referring to FIGS. 1 and 2 of the drawings, a typical double wall cryogenic vessel 10 is illustrated, which includes concentric inner and outer spherical walls 12 and 14 spaced apart to provide a gas-tight insulation space or chamber 16 between the walls therearound. The space is filled with a suitable granular insulation, such as Perlite. The vessel is supported by columns 18 joined thereto. A cryogenic liquid 20 is contained within the inner wall 12, leaving a vapor space 22 above the liquid level. The vessel is provided with a manway 24 for access to the interior of the inner wall 12 and of the vessel. Other fittings and appurtenances of conventional types are provided, being omitted for convenience of illustration, such as filling and delivery lines, vent fittings, gauges, and others.

The manway 24 provides access to the interior of the vessel through a circular opening 26 in the outer wall 14, and through a circular manhole 28 in the inner wall, registering with the outer wall opening and having a smaller diameter. The manway includes an inner closure 30 for the manhole 28, and an outer closure 32 around the manhole closure and extending outwardly therefrom to the exterior of the vessel. The manhole closure includes a flanged pipe fitting 34 secured to the inner wall around the manhole, by suitable means such as welding, and a cover 36 removably fastened thereto. The outer closure includes a flanged tubular expansion shell 38 secured to the inner wall around the manhold closure, and extending through the outer wall opening 26 with its flanged end protruding outwardly therefrom. The outer end of the expansion shell is closed by a cover 40 removably fastened thereto.

It will be observed that the manhole pipe fitting 34 is in intimate heat-conducting relation to the inner wall 12 and communicates with the interior of the vessel, so that it is subject to cryogenic temperatures. Similarly, the cover 36 is subject to such temperatures. Consequently, the joint 42 formed at the junction of the fitting and the cover is subject to comparable temperatures, posing a difficult problem of maintaining a tight closure or seal at the joint. Similar problems may be encountered with other members connected to the inner wall 12, which are joined to further members at joints subject to cryogenic temperatures.

The improved joint structure 42 provided by the invention is more clearly illustrated in FIG. 2. As seen in this view, the manhole fitting 34 includes a section of pipe 44 and a peripheral annular flange element or flange 46 extending perpendicularly or radially outwardly therefrom. A circular groove 48 is provided on the face 50 on the flange element, and it receives a sealing gasket 52 therein. A series of bolt holes or openings 54 extend through the flange element therearound. The cover 36 is a substantially flat circular plate member, and it includes a central covering section 56 and a peripheral annular flange element or section 58. The covering section bridges the opening in the pipe section 44, and the flange element extends over and mates with the flange element 46 of the fitting 34. An annular sealing tongue 60 protrudes from the face 62 of the cover flange element 58 in alignment with the groove 48. The tongue is received within the groove in sealing engagement with the gasket 52, to form a seal thereat. The cover flange element 58 also includes a series of bolt holes 64 extending through the element therearound and registering with the respective bolt holes 54 on the fitting flange element 46.

The flange elements 46 and 58 constitute joint elements for joining the fitting 34 and the cover 36 together. They are connected in the joint 42 on the closure 30, by bolt means comprising a stud or bolt 66 extending through each of the respective registering pairs of bolt holes 54 and 64, and nuts 68 and 70 in threaded engagement with each stud on opposite sides of the flange elements. The invention provides a compensating element 72 in the form of a washer or spacer mounted on each stud therearound and interposed between the flange elements and bolt means. The compensating element includes a central bolt hole or opening 74 registering with the flange openings 54 and 64. The bolt means thus spans the flange elements 46 and 58 and the compensating element 72 for clampingly fastening or bolting them together. The stud 66 extends freely through the flange elements and the compensating element, so that the several parts are unconnected and capable of movement relative to each other in the direction of the stud axis if otherwise unrestrained. The joint is secured by the clamping forces of the bolt means acting at the inner faces of the nuts 68 and 70 and exerted against the respective faces of the compensating elements 72 and the fitting flange element 46 when the nuts are tight.

The joint structure as so far described if formed in a conventional manner without the compensating element 72, would be suitable for ordinary applications at ambient temperatures. The problems arise when such a joint is subject to marked temperature changes, as is particularly the case in cryogenic applications. The temperature changes may involve, for example, cooling from 300° Kelvin (27° C.) to the normal boiling point of ethylene, 170° K., and for other cryogenic applications, as far down as the boiling point of helium, 4° K.

Thus, in the illustrative embodiment, the manhole fitting 34 and the cover 36 are constructed of aluminum alloy as a preferred material of construction exhibiting, inter alia, the requisite strength and no dectile to brittle transitions, and being otherwise very suitable for cryogenic service. The stud 66 and the nuts 68 and 70 are constructed of stainless steel (18% chromium, 8% nickel) which also exhibits excellent strength, ductility and other characteristics at cryogenic temperatures. Typical materials for the gasket 52 include stainless steel, soft aluminum, copper, monel metal, and the plastics polytetrafluoroethylene (Teflon) and polychlorotrifluoroethylene (Kel-F). Inasmuch as the bolt fastening means and the flange elements fastened thereby are constructed of dissimilar metals having different coefficients of thermal expansion, they contract differently and undergo relative contractive movement when cooled to cryogenic temperatures. Since aluminum has a greater coefficient of expansion than stainless steel, the aluminum flange elements contract more than the corresponding section or length of the steel stud. In the absence of means to compensate for the differential contraction, the seating force on the gasket 52 will be lost. The converse situation is encountered when the elements fastened together have an average coefficient of expansion which is less than that of the fastening means, so that with cooling, excessive forces are exerted on the fastening means. Similar difficulties are encountered when although the several parts may be constructed of the same material, the heat transfer rates are such that different parts or portions thereof are at different temperatures and subject to different coefficients of thermal expansion, so that differential changes in dimension occur.

In the invention, the compensating element 72 is subject to a further different coefficient of expansion under the temperature change conditions, different from both the bolt means and the remaining parts fastened thereby. In the illustrative embodiment, the coefficient of expansion of the compensating element is different from those of the bolt means and the flange elements. The compensating element is dimensioned in this illustration to approximately equalize the normally thermally induced changes in dimensions under such conditions of the bolt means and the parts fastened together thereby. Thus, as demonstrated hereinafter, the normal change in dimension of the stud 66, i.e., if unrestrained, between the inner bearing faces of the respective nuts 68 and 70 approximately equals the sum of the normal changes in dimensions of the flange elements 46 and 58, the washer 72 and the gasket 52. In this manner, the tightness of the joint is preserved, neither breaking the seal formed by the gasket 52 nor imposing excessive stress on the stud 66 and nuts 68 and 70. It is unnecessary to exactly equalize the changes in dimensions, since some relaxation of the pressure on the gasket 52 is permissible. Also, excess stress may be placed on the stud 66 initially to compensate for variations. Alternatively, the stud may withstand additional stress upon cool-down, and additional bolt tension may in fact be desirable and conveniently provided in this manner. The essential requirements are that the joint be kept tight yet free of excessive stresses.

In providing a joint as illustrated in FIG. 2, the dimension or thickness of the compensating element 72 is dependent upon the corresponding dimensions or thicknesses of the flange elements 46 and 58. FIG. 3 illustrates a construction for reducing the thickness of the compensating element, as indicated at 76 for the smaller element. In this embodiment, a circular recess 78 coextensive with the compensating element is provided on the outer side of the cover flange element 58, around each of the bolt openings 64.

FIG. 4 illustrates another joint structure according to the invention, for which representative calculations are made hereinafter. The joint 80 includes a manhole flange element 82, an aluminum manhole cover 84, stainless steel washers 86, and nickel steel compensating elements 88 and gasket 104. Tapped holes 90 are provided in the manhole flange element, and they are aligned with bolt holes 92 in a flange element 94 of the cover. Openings 96 and 98 in the respective washers 86 and compensating elements 88 are aligned with the bolt holes. Stainless steel studs or bolts 100 extend through the compensating elements, the washers, and the cover into threaded engagement in the tapped holes 90. Stainless steel nuts 102 are in threaded engagement with the outer ends of the studs. The nuts are tightened at ambient temperature to place an initial load on the studs and clamp or bolt the compensating elements, the washers, the cover and gasket together between the nut and the manhole flange element. The joint may be sealed by a gasket 104. The gasket is seated on the upper surface of the manhole flange, with the gasket engaging an annular tongue 108 on the cover.

The joint 80 illustrated in FIG. 4 is provided on the inner wall of a double wall cryogenic vessel for storing liquid hydrogen at 20° K. The thickness of the cover flange element 94, represented by $L_3$, is 1.875 inches, and the thickness of the stainless steel washer 86, represented by $L_2$, is 1/8 inch. It is desired to calculate the thickness of the nickel steel compensating element 88, represented by $L_1$, which is required in order to equalize the thermally induced changes in dimensions in cooling the vessel from ambient temperature of 293° K. (20° C.) to the boiling point of hydrogen, 20° K. The nickel steel employed for the compensating element is Dumet, an annealed alloy of 42% nickel, 0.8% manganese, and the balance substantially iron. The integrated coefficients of expansion (C) for the respective materials are as shown below, obtained from National Bureau of Standards Monograph 29, Thermal Expansion of Technical Solids At Low Temperatures, May 1961. The integrated values represent the integrated curves of the respective coefficients of expansion between 293° K. and 20° K. The following relationships obtain:

$C_i$ (nickel steel) $=52 \times 10^{-5}$ $L_1$ unknown
$C_s$ (stainless steel) $=296 \times 10^{-5}$ $L_2=0.125$ in.
$C_a$ (aluminum) $=416 \times 10^{-5}$ $L_3=1.875$ in.
$C_g$ (gasket-aluminum) $=415 \times 10^{-5}$ $L_4=0.125$ in.
$C_i L_1 + C_s L_2 + C_a + C_g L_4 = C_s(L_1+L_2+L_3+L_4)52L_1$
  $+37+778+52=296L_1+37+555+37$ $L_1=0.978$ in.

The calculated thickness of the nickel steel compensating element 88 therefore is 0.978″. The tensions involved are such that a one inch nickel steel element may be employed satisfactorily, and this increase in dimension will place an acceptable additional stress on the stud 100 and provide a tight joint. In this connection, it will be understood that due to varying conditions during cooling, the stud tension will vary during the transistion period. This may be compensated for by adjusting the initial tension.

As a further example, the foregoing calculations are made for the circumstance that the outer end of the stud 100 is at 70° K. while the manhole flange element 82 is at 20° K. Under these conditions, the integrated coefficient of expansion for the nickel steel remains substantially the same. With a linear thermal gradient over the length of the stud 100, the mean integrated coefficient of thermal expansion is $290.5 \times 10^{-5}$. Substituting in the above equation, the thickness of the nickel steel compensating element 88 is found to be 1.045″.

If under the preceding conditions, including the temperature gradient, it be desired to employ a nickel steel compensating element 88 containing 36% nickel (Invar) having an integrated coefficient of expansion of $26 \times 10^{-5}$, substitution in the above equation gives a thickness $L_1$ for the compensating element of 0.947″. For convenience, it may be desired to employ one inch elements. In such case, stress calculations indicate that the stress in the stud 100 will increase by about 1250 pounds per square inch. This is an acceptable value that provides an additional safety factor due to the increased stud tension.

It will be evident from the foregoing that the structure of the joint 80 provides a thermally induced contractive or expansive change in dimension of the stud 100 which is equal to the sum of the thermally induced contractive or expansive changes in dimensions of the parts bolted thereby. The parts contract when cooled, and expand when heated, in each case, the changes in dimensions are equalized. It is unnecessary to employ elastic or resilient members to compensate for the changes in dimensions, but inelastic or non-resilient members only need be employed. However, it may be advantageous at times to employ elastic or resilient members therewith, such as elastic spring plates or washers.

While the invention has been illustrated and described with reference to joint elements fastened together by fastening means having a lower coefficient of expansion, it will be apparent that the same principles apply when the opposite situation obtains. In this case, the compensating element 88 will be constructed of a material having a coefficient of expansion which is greater than the coefficients for the fastening means and the joint elements, rather than less than these values as in the above examples. An example of such an application of the invention is the installation of a sight glass or the like in a vessel to be lowered to cryogenic temperatures. Since glass has a lower coefficient of expansion than most metals which would be used in this type of connection, the problem exists of the bolt tension increasing to the point that the glass may be broken. By incorporating a compensating element with a higher coefficient of expansion in the joint or connection, such as an aluminum element, proper bolt tension can be maintained from ambient to cryogenic temperatures. The compensating element may also take other forms than the illustrative washers.

A joint structure according to the invention may be employed similarly in other circumstances where the joints are subject to large temperatures changes. For example, the joint structure may be employed at the junction of two pipes or conduits in a flow line to or from the storage vessel. The joint structure may be employed to connect pipes and other fittings associated with reactors, fuel compartments, refrigeration chambers, and other equipment.

The high nickel steels, preferably containing about 36–42% nickel, represent preferred materials of construction for the compensating elements. These steels may be processed in many ways, resulting in markedly different cofficients of expansion. For example, the steels may be annealed at 1550° F., or they may be cold drawn 50% and baked at 650° F. Such steels are well known and readily available, representative materials being hereinbefore identified as Invar and Dumet. The materials have the necessary notch ductility at cryogenic temperatures, and they exhibit the requisite strength and compatability with the cryogens. Copper, nickel, aluminum and most alloys of these metals exhibit no ductile to brittle transitions and, therefore, are very suitable for this type of service. Stainless steel (18–8, Type 304) and aluminum-magnesium alloys (A.A. 5052, 5083, and 5086) are employed in the construction of the storage vessels and exhibit the necessary ductility and other properties for use as compensating elements under appropriate circumstances. On the other hand, some metals, such as carbon steel, suffer an almost complete loss of ductility at low temperatures, so that they are not used at cryogenic temperatures. It is preferred that the notch ductility of the compensating element be comparable to the material of construction used in the vessels for cryogenic service. The coefficient of thermal expansion for the compensating element should be as small as possible with little variance between ambient temperature, about 293° K., and cryogenic temperature, 20° K. for liquid hydrogen.

It is further preferred for structural and also for economic reasons that the thickness of the compensating element be within about one-third of the total thickness or dimension of the parts fastened together between the bearing surfaces of the fastening means, e.g., the inner faces of the nuts in FIGS. 2 and 3, and the respective inner faces of the nut and the manhole flange element 82 in FIG. 4.

While preferred embodiments of the invention have been described and illustrated, it will be apparent that various changes and modifications may be made therein within the spirit and scope of the invention. Thus, for example, other types of fastening means may be employed, and they may be arranged differently. Other members may be fastened together, and they may be fastened in different ways. The joints may include additional elements. Different types of compensating elements may be employed, and they may be arranged in various ways to provide the desired results. It is intended that all such changes and modifications be included within the scope of the appended claims.

I claim:

1. A joint structure having component parts subject to different degrees of thermal expansion under given temperature change conditions and compensated for differential changes in dimension caused by said conditions, which comprises a joint element on one member for joining the member to a second member, bolt means for bolting said joint element to said second member and having a coefficient of expansion different from the coefficient of said joint element under said conditions, and compensating washer means having a further different coefficient of expansion under said conditions and interposed between said joint element and said bolt means, said washer means being dimensioned to achieve a predetermined relationship between dimensions at ambient temperature and dimensions at a service temperature of the bolt means and the parts bolted together thereby.

2. A joint structure as defined in claim 1 adapted for cryogenic applications and wherein said joint element is constructed of aluminum, said bolt means is constructed of stainless steel, and said compensating washer means is constructed of an alloy of iron and nickel.

3. In combination with a flanged fitting mounted on a cryogenic vessel and subject to cryogenic temperatures, and a flanged member adjoining said fitting, a joint structure for joining said fitting to said member including at least one of the respective flanges thereof and having component parts subject to different degrees of thermal expansion under conditions of temperature change from ambient to cryogenic temperatures and compensated for differential changes in dimension caused by said conditions, and further comprising bolt means for bolting said flanges together and having a coefficient of expansion different from the coefficient of said one flange under said conditions, and compensating washer means having a further different coefficient of expansion under said conditions and interposed between said one flange and said bolt means, said washer means being dimensioned to achieve a predetermined relationship by thermally induced changes between dimensions at ambient temperature and dimensions at a service temperature of the bolt means and the parts bolted together thereby.

4. The combination defined in claim 3 wherein said one flange is constructed of aluminum, said bolt means is constructed of stainless steel, and said washer means is constructed of an alloy of iron and nickel containing about 36–42% nickel.

References Cited by the Examiner
FOREIGN PATENTS 1,335,654   7/1963   France.

LOUIS G. MANCENE, *Primary Examiner.*

THERON E. CONDON, *Examiner.*

G. T. HALL, *Assistant Examiner.*